(12) United States Patent
More

(10) Patent No.: US 11,411,459 B2
(45) Date of Patent: Aug. 9, 2022

(54) GENSET ENCLOSURE WITH AIR DEFLECTOR ASSEMBLY

(71) Applicant: Cummins Power Generation IP, Inc., Minneapolis, MN (US)

(72) Inventor: Shashikant Ramdas More, Coon Rapids, MN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 57 days.

(21) Appl. No.: 17/247,205

(22) Filed: Dec. 3, 2020

(65) Prior Publication Data

US 2021/0175774 A1 Jun. 10, 2021

Related U.S. Application Data

(60) Provisional application No. 62/944,943, filed on Dec. 6, 2019.

(51) Int. Cl.

| | |
|---|---|
| *F02B 63/04* | (2006.01) |
| *F01P 5/06* | (2006.01) |
| *H02K 5/00* | (2006.01) |
| *H02K 5/20* | (2006.01) |
| *H02K 7/18* | (2006.01) |

(52) U.S. Cl.
CPC ............... *H02K 5/207* (2021.01); *F01P 5/06* (2013.01); *F02B 63/044* (2013.01); *H02K 7/1815* (2013.01); *F01P 2025/04* (2013.01); *F01P 2025/64* (2013.01); *F05D 2220/76* (2013.01); *H02K 2205/09* (2013.01)

(58) Field of Classification Search
CPC . F01P 5/06; F02B 63/04; F02B 63/043; F02B 63/044; F02B 71/04; H02K 2205/09; H02K 5/207
See application file for complete search history.

(56) References Cited

U.S. PATENT DOCUMENTS

| | | | |
|---|---|---|---|
| 1,170,730 | A | 2/1916 | Bengamin |
| 2,276,279 | A | 3/1942 | Asklund et al. |
| 2,407,184 | A | 9/1946 | Sparrow |
| 4,264,344 | A | 4/1981 | Ludecke et al. |
| 4,926,636 | A | 5/1990 | Tadokoro et al. |
| 5,042,444 | A | 8/1991 | Hayes et al. |

(Continued)

FOREIGN PATENT DOCUMENTS

| | | |
|---|---|---|
| DE | 10 2014 220 119 A1 | 4/2016 |
| EP | 2 233 342 A1 | 9/2010 |
| WO | WO-2010/008401 A1 | 1/2010 |

OTHER PUBLICATIONS

International Search Report and Written Opinion on International Application No. PCT/US2020/070847, dated Mar. 11, 2021, 12 pages.

*Primary Examiner* — Long T Tran
(74) *Attorney, Agent, or Firm* — Foley & Lardner LLP

(57) ABSTRACT

A genset includes an enclosure and a deflector assembly. The enclosure defines an at least partially enclosed space and a ventilation air opening that fluidly couples the enclosed space with an environment surrounding the enclosure. The deflector assembly includes a deflector disposed within the enclosed space and an angle driver. The angle driver is structured to adjust an angular position of the deflector relative to the ventilation air opening to minimize exported noise.

8 Claims, 11 Drawing Sheets

(56) References Cited

U.S. PATENT DOCUMENTS

| | | | |
|---|---|---|---|
| 5,297,517 A * | 3/1994 | Brandt | F02B 77/13 |
| | | | 181/204 |
| 5,433,175 A * | 7/1995 | Hughes | F02B 77/13 |
| | | | 181/204 |
| 5,894,115 A | 4/1999 | Weiner | |
| 6,142,108 A | 11/2000 | Blichmann | |
| 7,021,420 B2 | 4/2006 | Galaitsis | |
| 7,610,993 B2 | 11/2009 | Sullivan | |
| 8,240,429 B1 | 8/2012 | Singhal | |
| 8,881,694 B2 | 11/2014 | Gillett et al. | |
| 9,252,640 B2 | 2/2016 | Gillett et al. | |
| 9,587,537 B2 | 3/2017 | Allison | |
| 9,689,289 B2 | 6/2017 | Terada et al. | |
| 10,371,012 B2 | 8/2019 | Davis et al. | |
| 10,411,556 B1 * | 9/2019 | Sakaray | F02B 63/044 |
| 2003/0029390 A1 | 2/2003 | Campion | |
| 2003/0030279 A1 | 2/2003 | Campion | |
| 2007/0089411 A1 * | 4/2007 | Leistner | B64F 1/34 |
| | | | 60/599 |
| 2008/0257286 A1 | 10/2008 | Harich et al. | |
| 2010/0060016 A1 | 3/2010 | Hunter | |
| 2010/0060093 A1 | 3/2010 | Hunter | |
| 2011/0248511 A1 * | 10/2011 | Marlenee | H02P 9/10 |
| | | | 290/1 A |
| 2013/0147203 A1 * | 6/2013 | Gillett | H02K 5/207 |
| | | | 290/1 A |
| 2013/0187392 A1 * | 7/2013 | Janscha | F02B 63/04 |
| | | | 290/1 A |
| 2014/0246863 A1 | 9/2014 | Vallinayagam et al. | |
| 2018/0354712 A1 * | 12/2018 | Goleczka | H02K 5/20 |
| 2019/0063263 A1 | 2/2019 | Davis et al. | |
| 2019/0067991 A1 | 2/2019 | Davis et al. | |
| 2019/0280555 A1 | 9/2019 | Sakaray et al. | |

\* cited by examiner

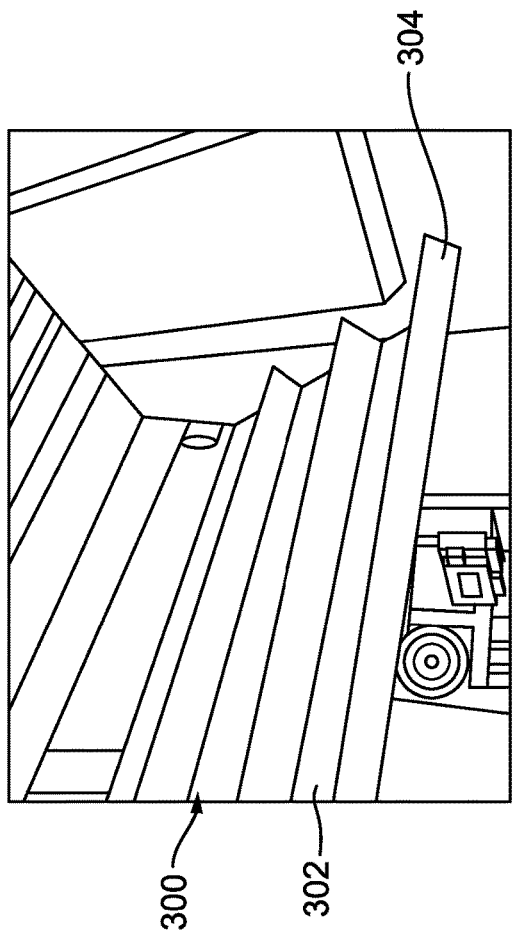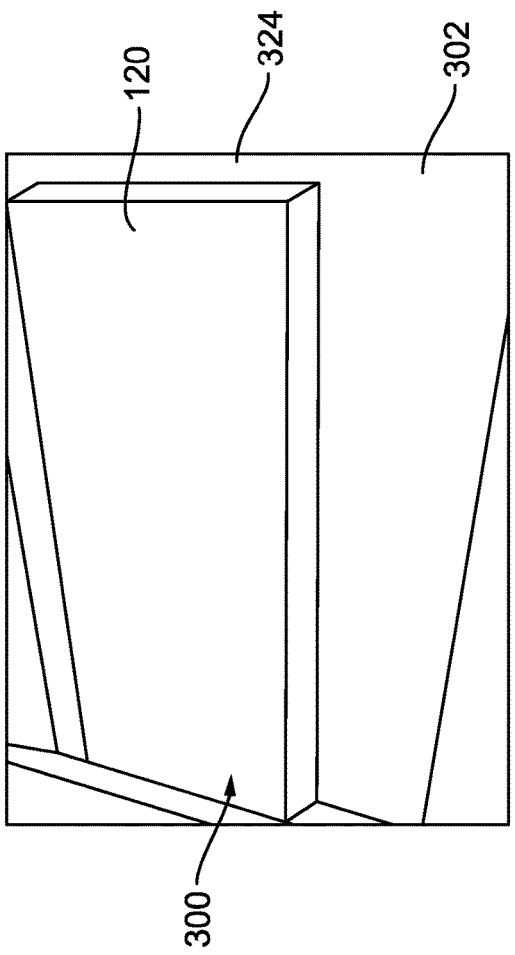

GENSET ENCLOSURE WITH AIR DEFLECTOR ASSEMBLY

CROSS-REFERENCE TO RELATED PATENT APPLICATIONS

The present application claims the benefit of and priority to U.S. Patent Application No. 62/944,943, filed Dec. 6, 2019, the entire contents of which is hereby incorporated by reference herein.

TECHNICAL FIELD

The present disclosure relates generally to enclosures for housing engines and generators.

BACKGROUND

Generator sets (also known as "gensets") may be employed for physical power production in a variety of applications (e.g., standby/backup power applications, etc.). A genset typically includes an engine and an electric power generator coupled to the engine. The engine is structured to mechanically drive the generator which, in turn, can produce electricity. The engine and the generator may be housed within an enclosure that allows the genset to operate outdoors, and to tolerate environmental extremes of temperature, humidity, precipitation (e.g., rain, snow, ice, etc.), and other factors. The enclosures typically include openings to facilitate the exchange of ventilation air between the interior of the enclosure and the environment surrounding the enclosure, which cools internal components during operation. However, the openings also provide a path through which sound from the engine and other components can exit the enclosure. For this reason, enclosures for gensets often include noise suppression devices (e.g., parallel baffle silencers, attenuators, etc.) in the cooling air intake and discharge paths, which attenuate noise by passing the cooling air through a series of parallel baffles. Among other disadvantages, these noise suppression devices are typically bulky and increase restriction along the flow path through the enclosure.

SUMMARY

In some embodiments, a genset includes an enclosure and a deflector assembly. The enclosure defines an at least partially enclosed space and a ventilation air opening that fluidly couples the enclosed space with an environment surrounding the enclosure. The deflector assembly includes a deflector disposed within the enclosed space and an angle driver. The angle driver is structured to adjust an angular position of the deflector relative to the ventilation air opening. In some implementations, the angle driver is structured to vary the angular position of the deflector relative to the ventilation air opening within a range between approximately 0° and 90°.

In some embodiments, the deflector assembly further includes a length driver structured to vary a distance that the deflector extends into a flow path of the ventilation air opening. In some implementations, the length driver is structured to vary the distance within a range between approximately 0 mm and 3000 mm (e.g., 2975 mm). In some embodiments, the deflector is formed in a plurality of sections that are coupled to one another end-to-end.

In some embodiments, the angle driver is controlled automatically based on feedback from one of a fan speed sensor, a pressure measurement sensor, an engine rotational speed sensor, and a sound sensor.

In some embodiments, the genset further includes a false wall assembly disposed adjacent to an end wall of the enclosure. The false wall assembly may include a false wall that may be movable relative to the end wall. For example, the false wall may be a plate movably coupled to the end wall and arranged in substantially parallel orientation relative to the end wall. In some implementations, the false wall assembly further includes a wall driver structured to vary a distance between the end wall and the false wall.

In some embodiments, a method of reducing noise through a ventilation air opening of a genset enclosure includes receiving at least one of first sensor data indicative of a pressure drop through the enclosure or second sensor data indicative of a noise level. The method additionally includes receiving a characteristic regarding a deflector of the genset enclosure. The method further includes controlling a position of the deflector in response to at least one of the first sensor data, the second sensor data, or the characteristic regarding the deflector.

In some embodiments, the characteristic is one of an angular position of the deflector and a length of the deflector.

In some embodiments, controlling the position of the deflector includes transmitting a control signal to at least one of an angle driver structured to vary an angular position of the deflector relative to the ventilation air opening or a length driver structured to vary a distance that the deflector extends into a flow path of the ventilation air opening. In some implementations, the method includes varying the angular position of the deflector relative to the ventilation air opening within a range between approximately 0° and 90°. In some implementations, the method includes varying the distance within a range between approximately 0 mm and 3000 mm (e.g., 2975 mm).

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIG. 5 is a forward perspective view of a deflector of the genset, according to another exemplary embodiment.

FIG. 6 is a rear perspective view of the deflector of FIG. 5.

Figure 1:
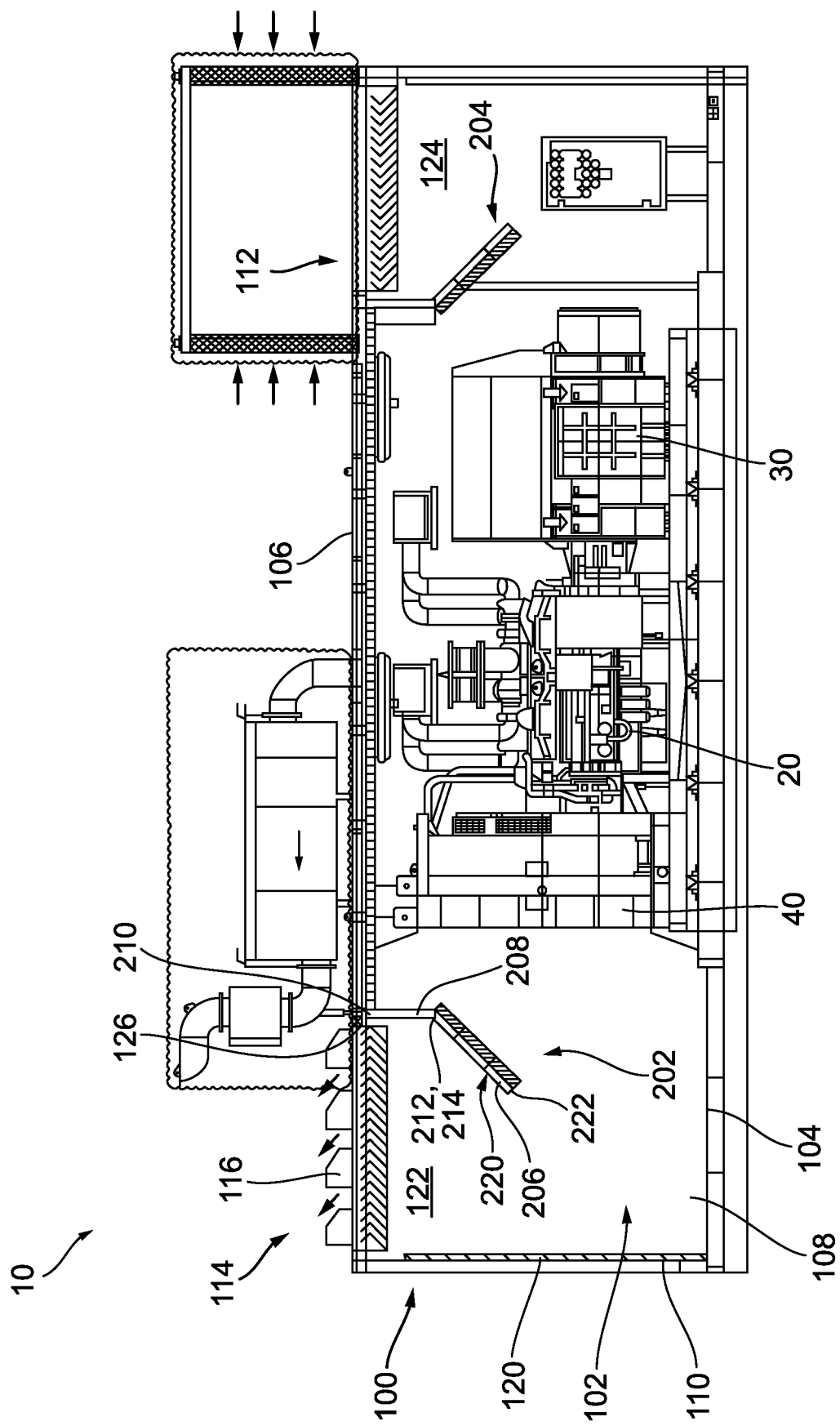
FIG. 1 is a side cross-sectional view of a genset, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to methods and devices for suppressing acoustic noise generated as a result of ventilation air entering and exiting a genset enclosure. In particular, embodiments described herein relate generally to an air deflector assembly including a deflector disposed proximate to a ventilation air opening of the enclosure. The deflector redirects noise in the air multiple times within the enclosure, toward an acoustic material lining disposed along an outer wall (e.g., end wall, etc.) of the enclosure. The acoustic material is specifically formulated to absorb and reduce the noise that is redirected by the deflector. In some embodiments, the enclosure includes two deflectors, a first deflector proximate to a ventilation air intake opening and a second deflector proximate to a ventilation air outlet opening. Each of the deflectors extends into the flow path defined by a respective one of the ventilation air openings at an angle, which may be adjusted to optimize air movement restriction and noise reduction within the enclosure.

In some embodiments, the position of the deflectors may be adjusted automatically based on sensor data from at least one sensor within or proximate to the enclosure. Among other benefits, the deflectors allow for more effective utilization of the acoustic material lining, which absorbs noise before it can escape through the ventilation air openings. Moreover, the deflectors help in achieving multiple reflections such that high frequency broadband turbulent noise can be effectively absorbed by the material lining. The various concepts introduced above and discussed in greater detail below may be implemented in any of numerous ways, as the described concepts are not limited to any particular manner of implementation. Examples of specific implementations and applications are provided primarily for illustrative purposes.

Various numerical values herein are provided for reference purposes only. Unless otherwise indicated, all numbers expressing quantities of properties, parameters, conditions, and so forth, used in the specification and claims are to be understood as being modified in all instances by the term "approximately." Accordingly, unless indicated to the contrary, the numerical parameters set forth in the following specification and attached claims are approximations. Any numerical parameter should at least be construed in light of the number reported significant digits and by applying ordinary rounding techniques. The term "approximately" when used before a numerical designation, e.g., a quantity and/or an amount including range, indicates approximations which may vary by (+) or (−) 10%, 5%, or 1%.

As will be understood by one of skill in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

Figure 2:
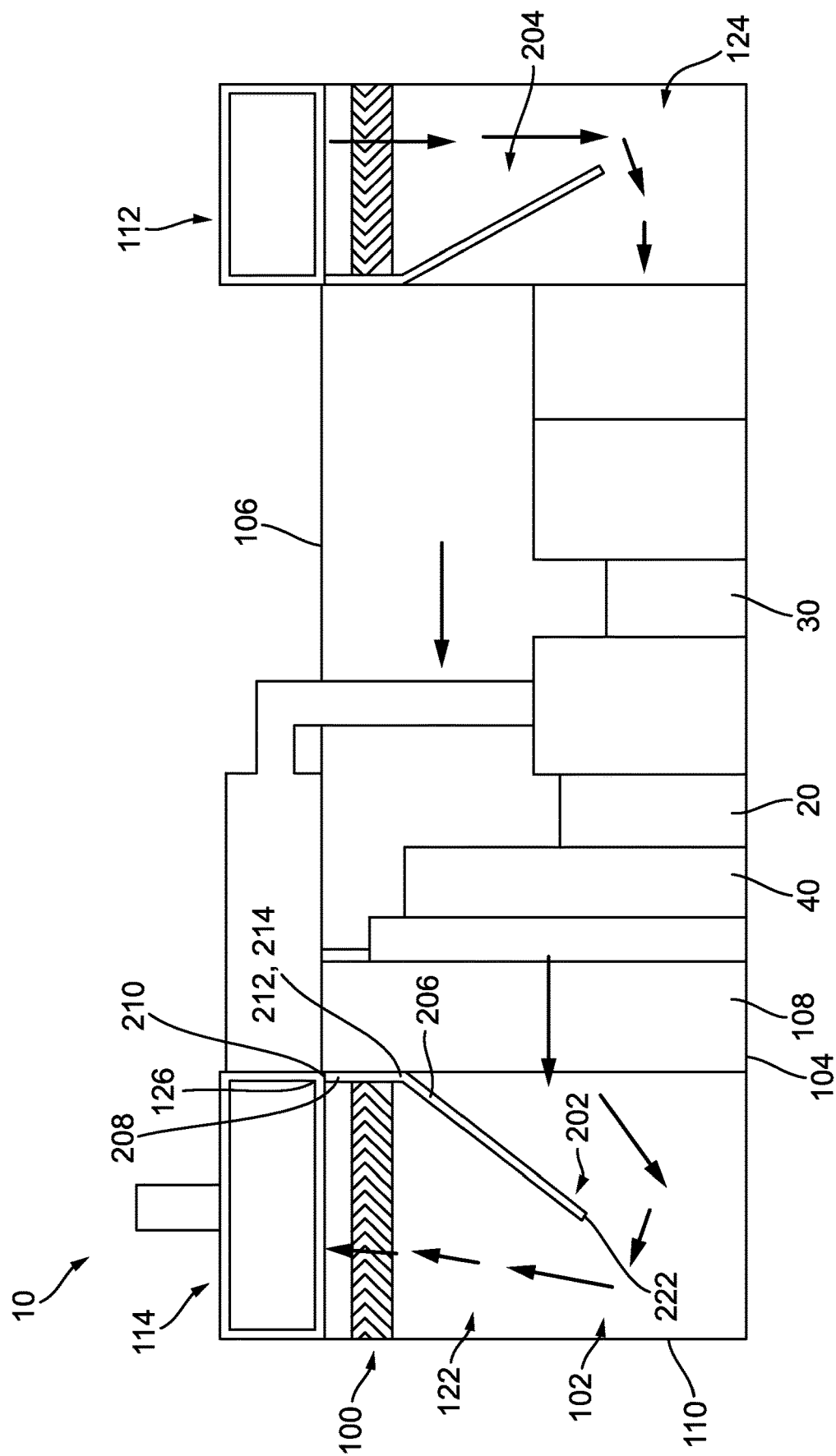
FIG. 2 is a schematic representation of the genset of FIG. 1.

FIG. 1 is a side cross-sectional view of a genset 10, according to an embodiment. FIG. 2 is a schematic representation of the genset 10 of FIG. 1. The genset 10 includes an engine 20, a generator 30, an air driver 40, an enclosure 100, and two deflector assemblies. In some embodiments, a different number of deflector assemblies may be provided. The engine 20 may be a diesel engine, a gasoline engine, a natural gas engine, a dual fuel engine, a biodiesel engine, an E85 engine, a flex fuel engine, a gas turbine, or another type of internal combustion engine or driver. In various embodiments, the engine 20 may be a high horse power (HHP) engine capable of providing power in the range of 500 hp to 4,500 hp or more. The generator 30 may be an electric power generator, an alternator, or the like. In one embodiment, the engine 20 is coupled to the generator 30 by, for example, a driveshaft (not shown). In operation, the engine 20 drives the generator 30 to produce electricity (e.g., power). Embodiments of the present disclosure are also applicable for various types of prime movers (mechanical, electrical, hydro, and/or fuel cell types) with various power strengths (low, medium, and high horse power).

The air driver 40 is structured to draw air (e.g., ventilation air, cooling air, etc.) from an environment surrounding the enclosure 100 through the enclosure 100 to cool the genset 10. In one embodiment, the air driver 40 is a fan. In other embodiments, the air driver 40 includes a plurality of fans positioned at different locations within the enclosure 100. In some embodiment, the fan may be coupled to the engine 20 (e.g., to the engine driveshaft via a pulley, etc.) such that a speed of the fan is proportional to a speed of the engine 20. In other embodiments, the fan is driven separately from the engine 20 (e.g., via an electric fan motor, etc.).

As shown in FIGS. 1-2, the enclosure 100 includes end walls (e.g., container walls, sidewalls, etc.) defining an internal volume 102 (e.g., an enclosed space, a hollow region, etc.) for housing the engine 20, the generator 30, the air driver 40, and other genset components. The end walls include a container floor 104, a container roof 106, and a pair of container sidewalls 108 arranged in substantially perpendicular orientation relative to the container floor 104 and container roof 106. The container floor 104 and the container roof 106 are coupled at their lateral edges to edges of the container sidewalls 108. One or more doors may be provided in one or both of the container sidewalls 108 to allow an operator of the genset 10 (e.g., maintenance or repair personnel) to enter the internal volume 102 defined by the enclosure 100 and access the genset 10. A pair of container end walls 110 are positioned at longitudinal ends of the enclosure 100 and coupled to corresponding edges of the container floor 104, the container roof 106, and the pair of container sidewalls 108 so as to seal the enclosure 100 from the surrounding environment. The container floor 104, container roof 106, container sidewalls 108, and container end walls 110 may be formed from any suitable material, for example, corrugated weathering steel. Furthermore, the enclosure 100 may have the dimensions of a standard ISO container (e.g., a length of about 6.1 meters, 12.2 meters, 14.6 meters or about 16.2 meters and a height of about 2.59 meters, 2.9 meters, or about 3.2 meters). In other embodiments, the enclosure 100 may include a non-ISO container, for example, any non-standard sized ISO container. The enclosure 100 may be formed from flat sheet metal, die-stamped sheet metal or a non-metallic material (e.g., wood, plastics, reinforced polymers, cement, concrete, fiber glass, carbon fiber, etc.).

In some embodiments, the enclosure 100 may be disposed on the ground. In other embodiments, the enclosure 100 may be mounted on a fuel tank (not shown) that is disposed on the ground, or mounted on skids (not shown) that are disposed on the ground. In other embodiments, the enclosure 100 may be positioned on a rooftop above the ground or another suitable location.

The enclosure 100 is configured to provide air flow therethrough to cool the genset 10 and provide intake air for the engine of the genset 10. As shown in FIG. 2, the enclosure includes ventilation air openings including a ventilation air intake opening, shown as air inlet 112, and a ventilation air outlet opening, shown as air outlet 114. In at least one embodiment, each of the air inlet 112 and the air outlet 114 are defined in the container roof 106 and fluidly couple the internal volume 102 with an environment surrounding the enclosure 100. In the embodiment of FIG. 2, the air inlet 112 and the air outlet 114 are disposed on opposite ends of the container roof 106. In some embodiments, the air inlet 112 and/or the air outlet 114 may include louvers 116 or other elements that allow air to enter the enclosure 100, while redirecting water (e.g., due to rainfall) away from the enclosure 100 or to predefined water drainage areas of the enclosure 100. In other embodiments, the air inlet 112 and the air outlet 114 may be provided in another location along the enclosure 100 (e.g., the pair of container sidewalls 108 and/or the pair of container end walls 110).

Figure 3:
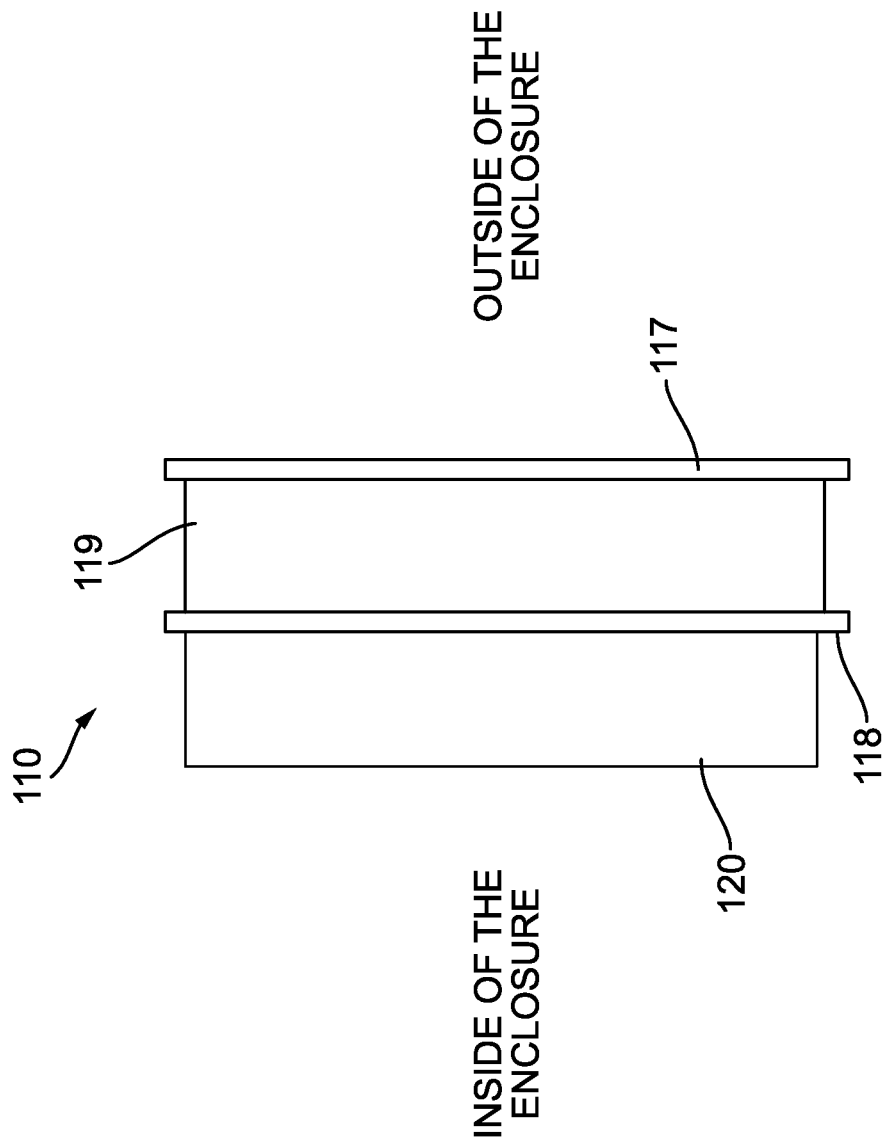
FIG. 3 is a side cross-sectional view through an end wall of the genset of FIG. 1.

In various embodiments, inner surfaces of the container floor 104, the container roof 106, the pair of container sidewalls 108, and the pair of container end walls 110 may be lined with acoustic dampening materials (e.g., acoustic material lining, etc.) structured to absorb and attenuate noise produced by the genset 10. The noise may be generated by internal components such as the engine 20, the generator 30, the fan(s), or the like. Alternatively, or in combination, the noise may be produced as a result of air flow passing through the enclosure 100 via the air inlet 112 and the air outlet 114. FIG. 3 is a side cross-sectional view through one of the container end walls 110. As shown, the container end wall 110 defines an outer skin 117 facing an environment surrounding the enclosure 100 and an inner skin 118 facing the internal volume 102. The inner skin 118 and outer skin 117 may be made from a metal such as carbon steel or another structurally robust material. In the embodiment of FIG. 3, the container end wall 110 further includes an air cavity 119 that is "sandwiched" or otherwise disposed between the inner skin 118 and the outer skin 117. Among other benefits, the air cavity may further attenuate noise produced by the genset 10 (see also FIG. 2). An acoustic damping material 120 is mechanically connected (e.g., bonded with an adhesive product, coupled using magnets, etc.) to the inner skin 118 within the internal volume 102. In some embodiments, the acoustic damping material 120 completely lines the inner skin 118 along the container end walls 110, sidewalls 108, floor 104, and roof 106. In other embodiments, the acoustic damping material 120 includes individual sheets placed along portions of at least one of the end walls 110, sidewalls 108, floor 104, and roof 106. For example, the acoustic damping material 120 may be formed in 0.5 ft.×1 ft. sheets, 1 ft.×2 ft. sheets, 2 ft.×4 ft. sheets, 4 ft.×8 ft. sheets, or any other suitable dimensions. In various embodiments, the acoustic damping material 120 may include fibrous (e.g., rock wool, glass wool, mineral wool, etc.), non-fibrous (e.g., polyurethane foam, melamine foam, etc.) materials, or the like.

Figure 4:
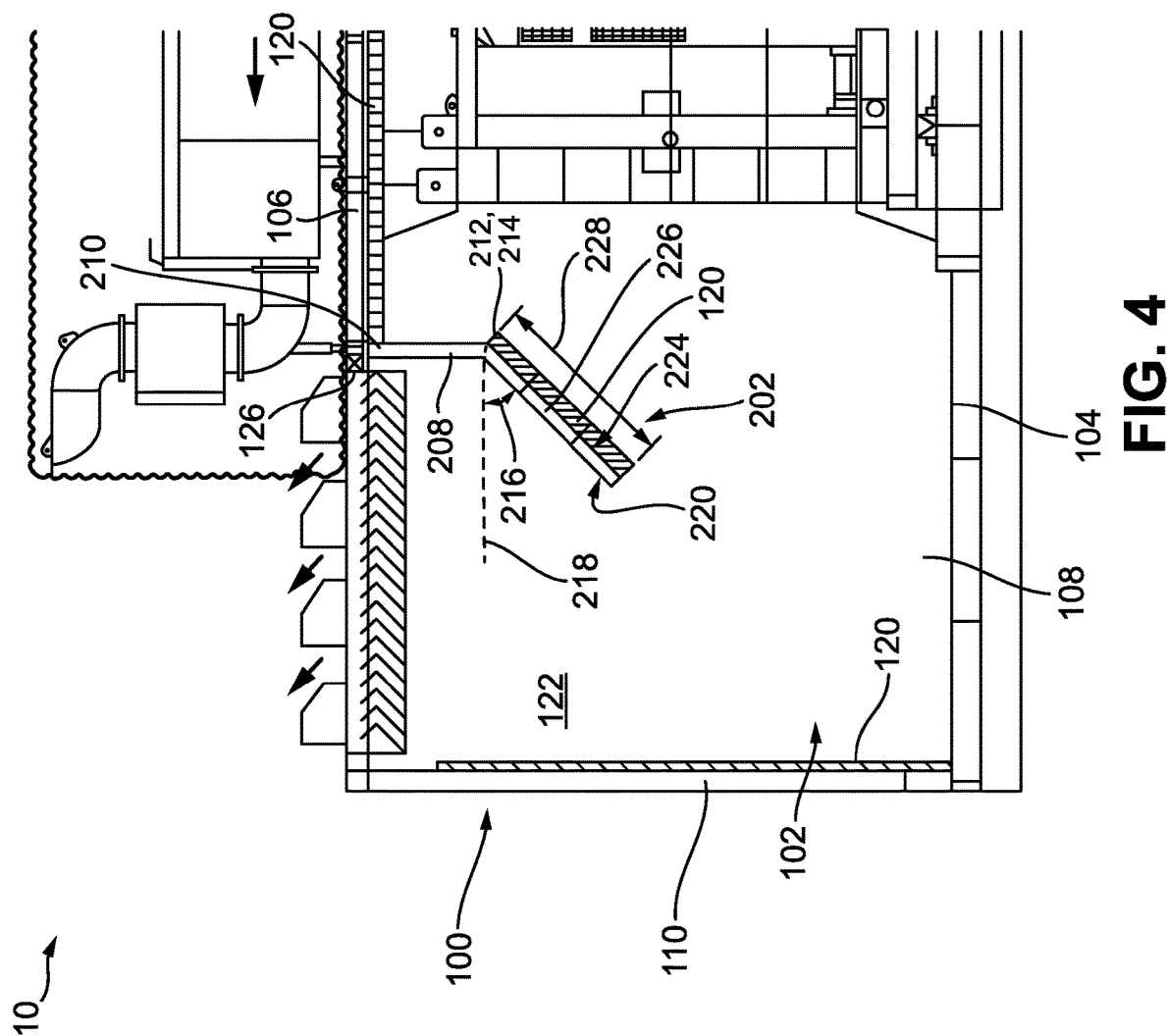
FIG. 4 is a side cross-sectional view of a portion of the genset of FIG. 1.

The genset 10 includes a deflector assembly structured to redirect noise in the air multiple times within the enclosure 100, toward the acoustic damping material 120. As shown in FIGS. 1-2, the genset 10 includes two deflector assemblies, including a first deflector assembly 202 and a second deflector assembly 204 disposed on an opposite end of the enclosure 100 as the first deflector assembly 202. Each of the first and second deflector assemblies 202 and 204 are mechanically connected to the container roof 106. In the embodiment of FIGS. 1-2, the first deflector assembly 202 is an outlet deflector assembly structured to reflect air proximate to the air outlet 114, while the second air deflector assembly 204 is an inlet deflector assembly structure to reflect air proximate to the air inlet 112. FIG. 4 shows a side cross-sectional view of a portion of the genset 10 near the first deflector assembly 202. As shown in FIG. 4, the first deflector assembly 202 includes a deflector 206 and a support member 208. The support member 208 is structured to position the deflector 206 within an outlet region 122 of the internal volume 102 that is disposed vertically below the air outlet 114. A first end 210 of the support member 208 (e.g., an upper end as shown in FIG. 4) is mechanically connected to the container roof 106 proximate to an interior edge 126 of the air outlet 114 (e.g., the edge of the air outlet 114 disposed farthest from the leftmost container end wall 110). A second end 212 of the support member 208 is hingedly coupled to an upper end 214 of the deflector 206, such that the deflector 206 can rotate (e.g., pivot, etc.) about the connection point between the deflector 206 and the support member 208. As shown in FIG. 4, the support member 208 is a generally rectangular plate that extends away from the container roof 106 in substantially perpendicular orientation relative to the container roof 106. In other embodiments, the support member 208 is a post, rod, flange or bracket structured to support the weight of the deflector 206. The support member 208 may be made from metal such as aluminum, carbon steel, plastic, and/or another rigid material, or combinations of materials.

As shown in FIG. 4, the deflector extends into a flow path defined by the air outlet 114 at an angle 216, defined between (1) a horizontal reference plane 218 that is substantially parallel to the air outlet 114; and (2) an upper surface 220 of the deflector 206. The upper end 214 of the deflector 206 is positioned adjacent to the interior edge 126 of the air outlet 114. A lower end 222 of the deflector 206 is positioned within the outlet region 122. In other words, the deflector 206 is positioned such that at least a portion of the air outlet 114 is occluded by the deflector 206 when viewed from above the enclosure 100 (i.e., when viewed normal to the container roof 106).

As shown in FIG. 4, a lower surface 224 of the deflector 206 is lined with an acoustic damping material, which may be the same or similar to the acoustic damping material 120 described with reference to FIG. 3. For convenience, similar numbering will be used herein to identify similar components. The acoustic damping material 120 extends across the entire lower surface 224 between the upper end 214 and lower end 222 of the deflector 206. In some embodiments, the acoustic damping material 120 is bonded to the lower surface 224 using an adhesive product such as glue or epoxy. In other embodiments, the acoustic damping material 120 is mounted to the lower surface 224 using screws, bolts, clips, magnets, or another mechanical fastener. Among other benefits, the acoustic damping material 120 improves noise attenuation by absorbing sound generated by the engine 20 and other internal components of the genset 10 (see also FIGS. 1-2).

In some embodiments, the second deflector assembly 204 has a similar structure as the first deflector assembly 202 (e.g., is identical to the first deflector assembly 202). As shown in FIGS. 1-2, the second deflector assembly 204 is at least partially disposed within an inlet region 124 of the internal volume 102 and extends at an angle into the inlet region 124 (e.g., into a region disposed vertically below the air inlet 112). In some embodiments, the second deflector assembly 204 is symmetrical with the first deflector assembly 202. In other embodiments, the orientation of the second deflector assembly 204 is different from the first deflector assembly 202.

In various embodiments, the deflector 206 may be extendible to vary a distance that the deflector 206 extends into the flow path of the air outlet 114. In other words, the deflector 206 may be structured so that a user may manually and/or automatically adjust a length 228 of the deflector 206 (e.g., a length of the deflector 206 between the upper end 214 and the lower end 222). As shown in FIG. 4, the deflector 206 is formed in multiple discrete sections 226 arranged end-to-end (e.g., abutted) along the length 228 of the deflector 206. These sections 226 may be pulled apart (e.g., separated) from one another to increase the overall length 228 of the deflector 206. In some embodiments, the deflector 206 may include additional, hidden sections that can be collapsed into hollow spaces in the deflector 206 (e.g., between and/or beneath sections 226, similar to the structure of an extendible dining table). In other embodiments, the sections 226 may be positioned above a single thin sheet of metal and movable along an upper surface of the thin sheet to expand and retract. In yet other embodiments, the deflector 206 includes a thin film of metal that is "sandwiched" or otherwise disposed between adjacent sections 226 and that accordions into a flat (e.g., planar) sheet as the sections 226 are pulled apart.

The structure of the deflector may differ in various embodiments. For example, FIG. 5 is a forward perspective view of a deflector assembly 300 of a genset that is formed as a single unitary body. The deflector assembly 300 includes a deflector 302 made from a thin sheet of metal (e.g., aluminum, carbon steel, etc.). The deflector 302 includes ribs 304 that are bent or otherwise formed into the deflector 302 to improve the mechanical strength of the deflector 302. As shown in FIG. 5, the ribs 304 extend across the upper surface of the deflector 302, along a width of the deflector 302, in substantially perpendicular orientation relative to container sidewalls of a genset enclosure. FIG. 6 is a rear perspective view of the deflector 302 of FIG. 5. As shown in FIG. 6, a lower surface 324 of the deflector 302 is lined with a sheet of acoustic damping material 120, similar to the deflector 206 described with reference to FIG. 4.

Figure 7:
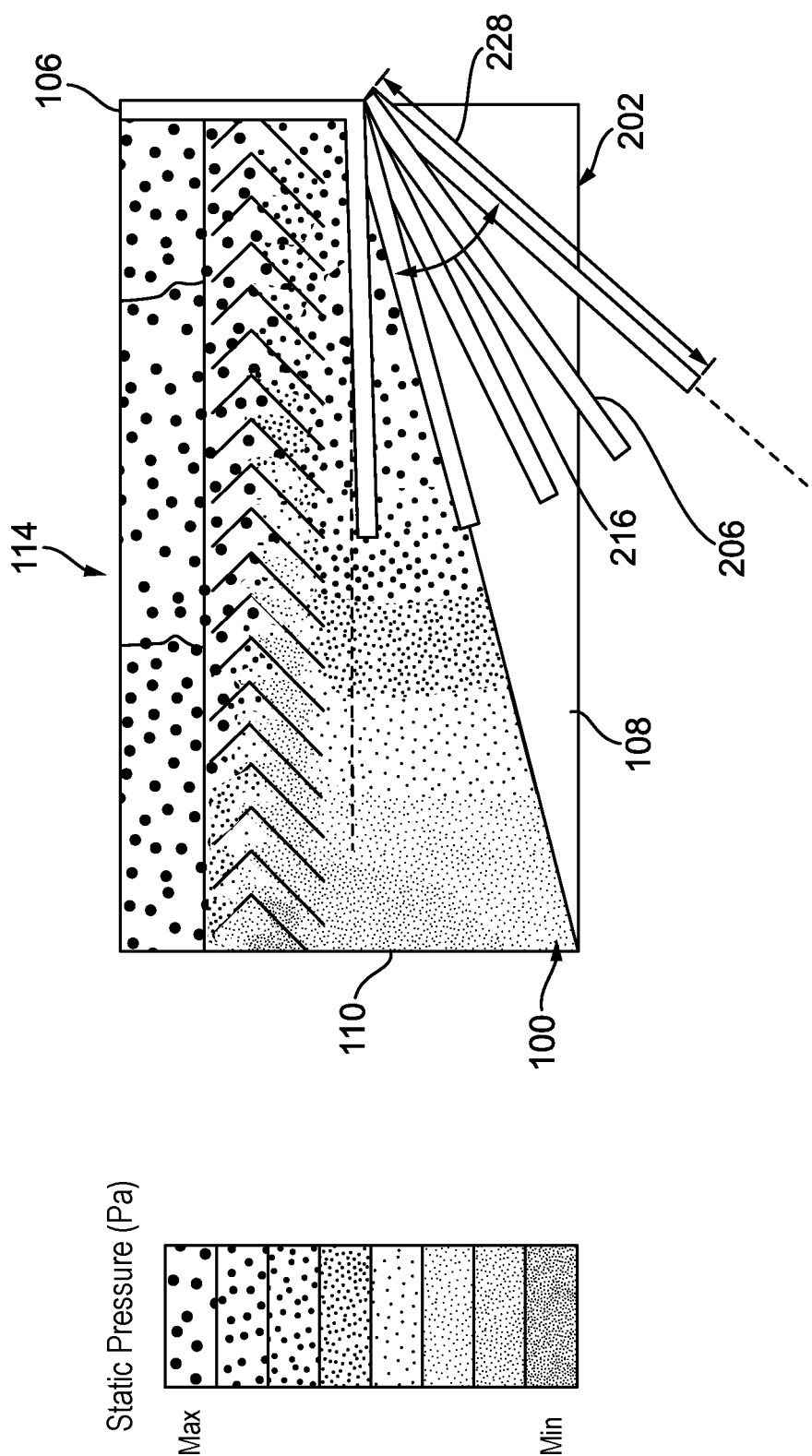
FIG. 7 is a simplified side cross-sectional view of the deflector of FIG. 4, according to an embodiment.

As described above, the deflector (e.g., the deflector 206 of FIG. 4 and the deflector 302 of FIGS. 5-6) extends into a flow path defined by the air outlet at an angle which may be adjusted to optimize air movement restriction and noise reduction within the enclosure. FIG. 7 is a simplified side cross-sectional view of the deflector 206 of FIG. 4. As shown in FIG. 7, as the angular position of the deflector 206 (e.g., angle 216) decreases, the deflector 206 moves closer to the air outlet 114, and the overall restriction to air flow through the air outlet 114 increases. The resistance/impediment to air flow provided by the deflector 206 introduces turbulence (i.e., broadband noise turbulence) in the air flow within the enclosure 100 and causes air to recirculate back towards the engine, away from the air outlet 114. As such, any sound/noise directed toward the deflector 206 is reflected (e.g., redirected, etc.) toward the walls of the enclosure 100 (e.g., the container roof 106, the container sidewalls 108, the container end walls 110, etc.). In some instances, the sound/noise is reflected multiple times by the deflector 206 toward the wall(s) of the enclosure 100. The acoustic damping material 120 (shown in FIG. 3) absorbs the broadband noise turbulence that is created by the deflector 206, thereby improving overall noise attenuation. As the angular position of the deflector 206 increases, the deflector 206 moves farther away from the air outlet 114, and the air flow restriction through the air outlet 114 decreases, along with the reduction in noise.

The amount of noise attenuation provided by the deflector 206 is a function of the position of the deflector 206 relative to the air outlet 114 (e.g., the length 228 of the deflector 206 and the angular position, or angle 216 of the deflector 206), the geometry of the air outlet 114, and the air flow rate through the enclosure 100. For example, for a genset 10 operating at an average air flow velocity of approximately 4 m/s, in which the overall air outlet 114 opening length is 3000 mm or less (e.g., 2980 mm) and where the opening width is approximately equal to the width of the deflector 206 (into the page as shown in FIGS. 4 and 7), it has been found that a deflector length 228 of approximately 1300 mm and a deflector angle 216 of approximately 45° sufficiently attenuates exported noise from the enclosure 100 to below threshold levels. Again, the optimal arrangement of the deflector within the enclosure 100 will vary depending on operating conditions and the geometry of the enclosure 100.

Figure 8:
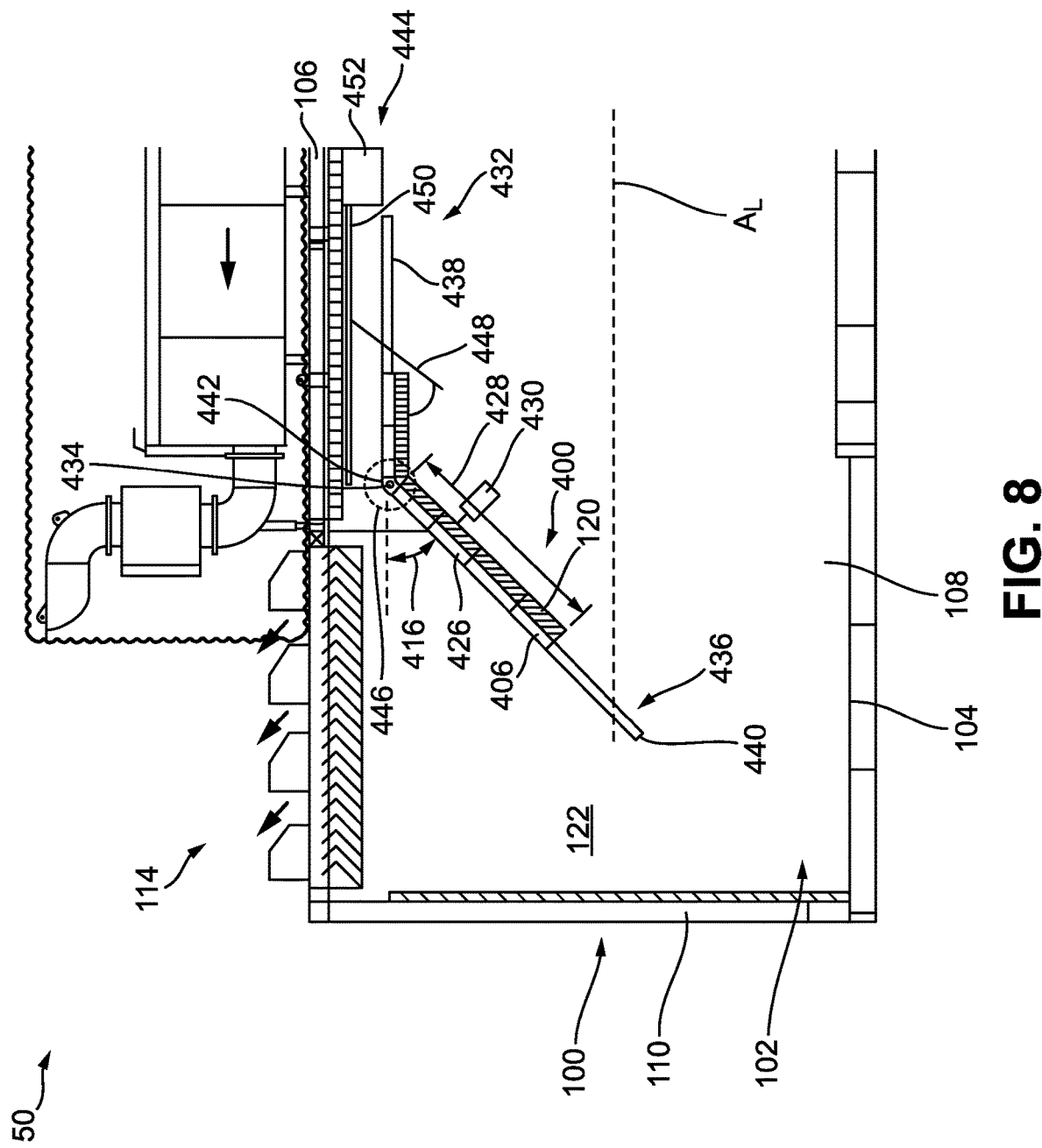
FIG. 8 is a side cross-sectional view through a portion of a genset, according to another embodiment.

FIG. 8 is a side cross-sectional view through a portion of a genset 50, according to another embodiment. The genset 50 includes a deflector assembly 400 structured to automatically adjust a position of a deflector 406 relative to an air outlet 114 (e.g., ventilation air outlet opening) of a genset enclosure 100, without manual manipulation of the deflector 406 by a user. More specifically, the deflector assembly 400 includes an angle driver 430 structured to adjust an angular position (e.g., angle 416) of the deflector 406 relative to the air outlet 114 and a length driver 432 structured to vary a length 428 of the deflector 406 (e.g., a distance that the deflector extends into a flow path of the air outlet 114, a length of the deflector 406 measured from a position that is vertically aligned with an interior edge 126 of the air outlet 114). As shown in FIG. 8, the deflector 406 is formed in multiple discrete sections (segments) 426 arranged end-to-end, such that an end of a first section of the plurality of sections is coupled to an end of a second section of the plurality of sections. The sections 426 are hingedly coupled at their ends such that each section 426 may rotate and/or pivot about a connection point 434 between adjacent sections 426 in at least one direction (e.g., counterclockwise, etc.).

As shown in FIG. 8, the deflector assembly 400 additionally includes a pair of guide tracks 436 that are mechanically connected to the container sidewalls 108. In other embodiments, the guide tracks 436 may be mechanically connected to the container roof 106 such that the guide tracks 436 are at least partially suspended within the internal volume 102. In yet other embodiments, the guide tracks 436 may be supported within the internal volume 102 by a framework extending vertically upwardly from the container floor 104. The guide tracks 436 extend in a longitudinal direction (e.g., longitudinal axis $A_L$) along a length of the enclosure 100 (e.g., in a substantially parallel orientation relative to the container sidewalls 108) from a central position above the engine (not shown) toward the container end wall 110 and the air outlet 114. A first portion 438 of each guide track 436 is oriented substantially parallel to the longitudinal axis $A_L$. A second portion 440 of each guide track 436 extends from an end of the first portion 438 toward the container end wall 110 at an angle 416 into the inlet region 124 of the enclosure 100. Each guide track 436 additionally includes a flexible coupling 442 that hingedly couples the first portion 438 to the second portion 440 such that the second portion 440 may rotate toward and away from the air outlet 114.

As shown in FIG. 8, the sections 426 of the deflector 406 are movably coupled to the guide tracks 436 at either end of the sections 426, such that the deflector 406 may be repositioned along the guide tracks 436. In various embodiments, the sections 426 are movably coupled to the guide tracks 436 by sliding and/or rolling elements that are at least partially contained within the guide tracks 436. For example, the sections 426 may be mechanically supported within the guide tracks 436 by rollers and/or ball bearings in a garage-door-like configuration. In other embodiments, the mechanism used to adjust the length 428 of the deflector 406 may be different. For example, the deflector assembly may be structured as a roll-up door (e.g., a coiling door formed from slat sections that roll around a drum and/or mandrel within the internal volume 102 of the enclosure 100). In yet other embodiments, the deflector assembly may include a tilt-up canopy style door (e.g., a tilt-up canopy style garage door) made from a single piece of material. In other embodiments, the deflector assembly may include another form of extendible deflector.

The angle driver 430 is structured to adjust an angular position of the second portion 440 of the guide tracks 436, and correspondingly, the angle 416 at which the deflector 406 extends into the flow path beneath the air outlet 114. In the embodiment of FIG. 8, the angle driver 430 includes a linear actuator 444 that is pivotally coupled to the second portion 440. The linear actuator 444 may be a hydraulic cylinder, a pneumatic cylinder, or the like. In other embodiments, the angle driver 430 includes a stepper motor (e.g., stepper motor 446) rotatably coupled to the second portion 440 and structured to rotate the second portion 440 (e.g., in a clockwise or counterclockwise orientation) in predefined angular increments (e.g., in 15° increments, 20° increments, etc.). In yet other embodiments, another form of angular repositioning device may be used.

The length driver 432 is structured to reposition the deflector 406 within the guide tracks 436. As shown in FIG. 8, the length driver 432 includes a connecting arm 448, a drive track 450, and a motor 452. The drive track 450 and the motor 452 are mechanically connected to the container roof 106 at a central position above the engine (not shown). In other embodiments, the drive track 450 and motor 452 may be separated from the container roof 106 by a framework or other support member. The connecting arm 448 extends between the deflector 406 and the drive track 450, and mechanically couples the deflector 406 to the drive track 450. The connecting arm 448 is hingedly coupled to the deflector 406 and the drive track 450 at opposing ends of the drive track 450. The connecting arm 448 is also movably coupled to the drive track 450 such that the connecting arm 448 may be repositioned within the drive track 450 by the motor 452 (e.g., by a pulley and/or drive chain extending along the length of the drive track 450). In other embodiments, the length driver 432 may include additional, fewer, and/or different components. For example, the length driver 432 may include a spring member structured to facilitate retracting the deflector 406 toward the motor 452 (e.g., away from the air outlet 114) by applying a return force that counteracts the gravity force acting on the deflector 406. The spring member may include an extension spring, a torsion spring, or the like. In other embodiments, another form of linear repositioning device may be used to adjust the length 428 of the deflector 406.

Figure 9:
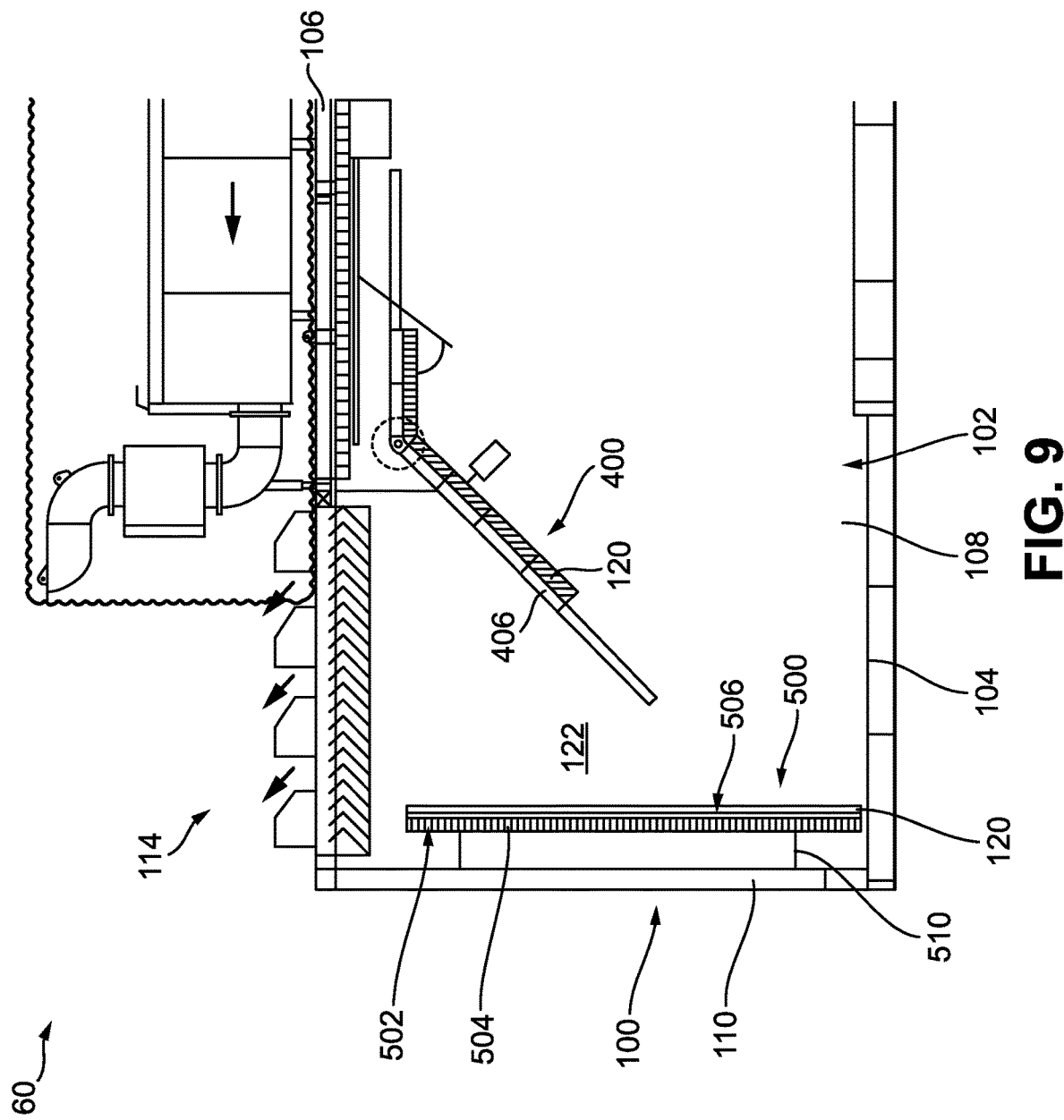
FIG. 9 is a side cross-sectional view through a portion of a genset, according to another embodiment.

FIG. 9 is a side cross-sectional view of a genset 60 that includes a movable container end wall assembly, shown as false wall assembly 500, in addition to the deflector assembly 400. The false wall assembly 500 includes a false wall 502 that is repositionable within the internal volume 102 relative to the leftmost container end wall 110. As shown in FIG. 9, the false wall 502 includes a support plate 504 that is spaced apart from the container end wall 110 in substantially parallel orientation relative to the container end wall 110. In other embodiments, the position of the false wall 502 within the internal volume 102 may be different. For example, the false wall 502 may be mechanically connected to one of the container roof 106, the container sidewalls 108, the container floor 104, etc. In other embodiments, the false wall assembly 500 may include a plurality of false walls 502 disposed at different locations throughout the enclosure 100. As shown in FIG. 9, an internal volume facing surface 506 of the support plate 504 is lined with an acoustic damping material, which may be the same or similar to the acoustic damping material 120 described with reference to FIG. 3. In other embodiments, the end wall facing surface of the support plate 504, opposite the internal volume facing surface 506, is also lined with acoustic damping material 120. The false wall 502 can also be angled to deflect the air and noise towards to the genset enclosure walls.

Figure 10:
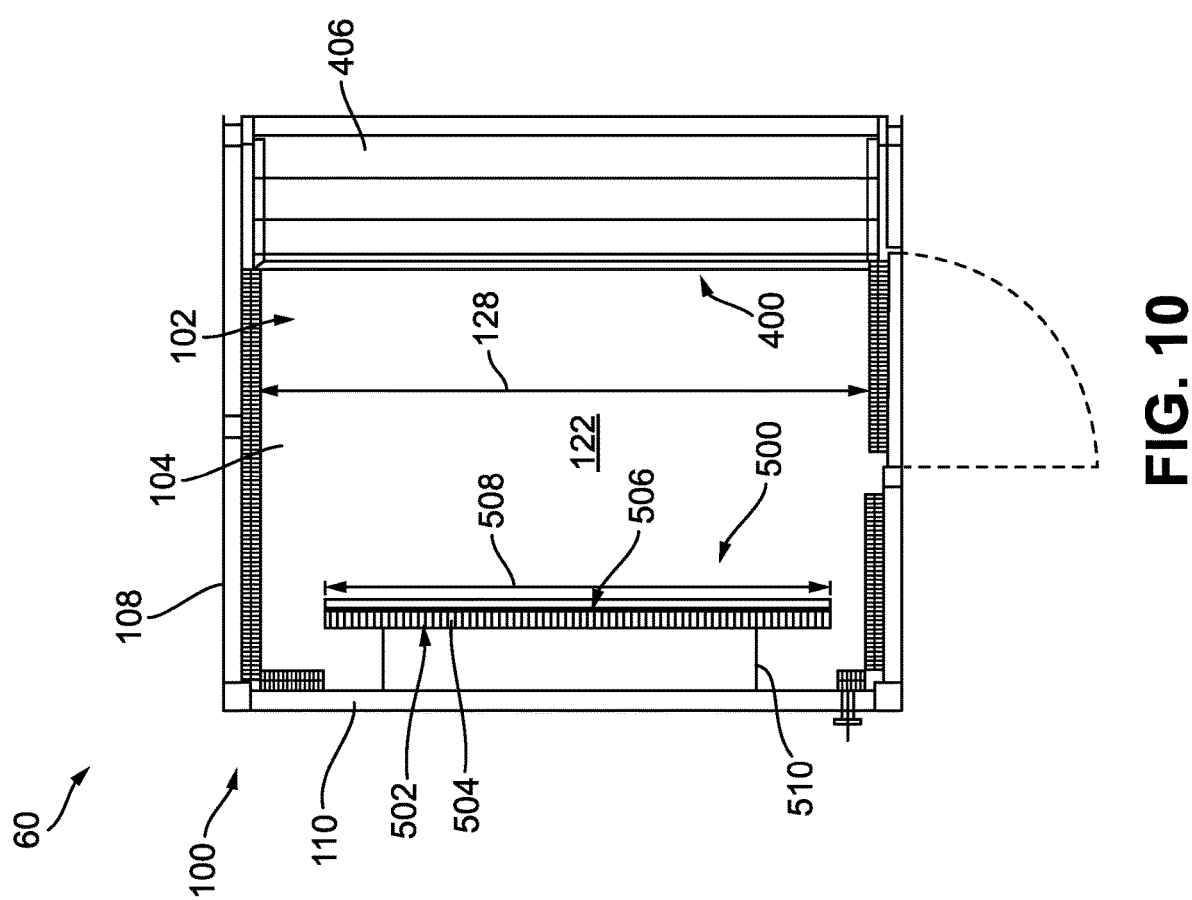
FIG. 10 is a top cross-sectional view through the portion of FIG. 9.

FIG. 10 is a top cross-sectional view of the genset 60 of FIG. 9. As shown, a width 508 of the false wall 502 is less than an overall width 128 of the enclosure 100 between the pair of container sidewalls 108. In other embodiments, the width 508 of the false wall 502 may be approximately equal to the overall width 128. The false wall 502 is spaced apart from the container end wall 110 defining a ducted region 130 therebetween. In the embodiment of FIG. 10, the false wall 502 is disposed within the inlet region 124 in the flow path below the air outlet 114. Among other benefits, the ducted region 130 helps redirect the flow of air and increases turbulence within the interior volume of the enclosure 100. The ducted region 130 may also help channel air flow between the floor and roof to improve air flow uniformity through the enclosure. Together, the false wall assembly 500 and the deflector assembly 400 may be used to adjust the flow characteristic (e.g., flow streamlines, etc.) through the internal volume 102 to optimize the balance between air flow restriction and noise attenuation.

As shown in FIGS. 9-10, the false wall assembly 500 additionally includes a false wall driver 510 structured to reposition the false wall 502 within the internal volume 102 (e.g., relative to the container end wall 110, etc.). In some embodiments, the false wall driver 510 includes a single actuator (e.g., linear actuator) structured to adjust the spacing between the false wall 502 and the container end wall 110. The actuator may be a hydraulic cylinder, a pneumatic cylinder, an adjustable screw (e.g., jack screw), and/or another form of repositionable actuator. In other embodiments, the false wall driver 510 include a plurality of actuators structured to adjust the spacing and/or angle between the false wall 502 and the container end wall 110.

In some embodiments, the optimal position of the deflector(s) and/or false wall(s) may be pre-determined; for example, the position of the deflector(s) and/or false wall(s) may be calculated based on predefined operating parameters and enclosure specifications. For example, the position of the deflector may be determined based on first order design calculations of one, or a combination of, of airflow restriction and noise attenuation at a predefined fan operating speed (e.g., nominal air flow velocity through the enclosure). The position of the deflector may be adjusted to minimize exported noise from the interior volume of the enclosure (e.g., through the air inlet 112 and the air outlet 114 as shown in FIGS. 1-2) and/or to minimize exported noise at a target air flow restriction. In other embodiments, the position of the deflector may be determined based on computational analysis such as Finite Element Method (FEM), Boundary Element Method (BEM), Statistical Energy Analysis Method (SEA), and Computational Fluid Dynamics Method (CFD); for example, by iteratively varying the length and angular position of the deflector to balance the overall noise attenuation and airflow restriction.

Figure 11:
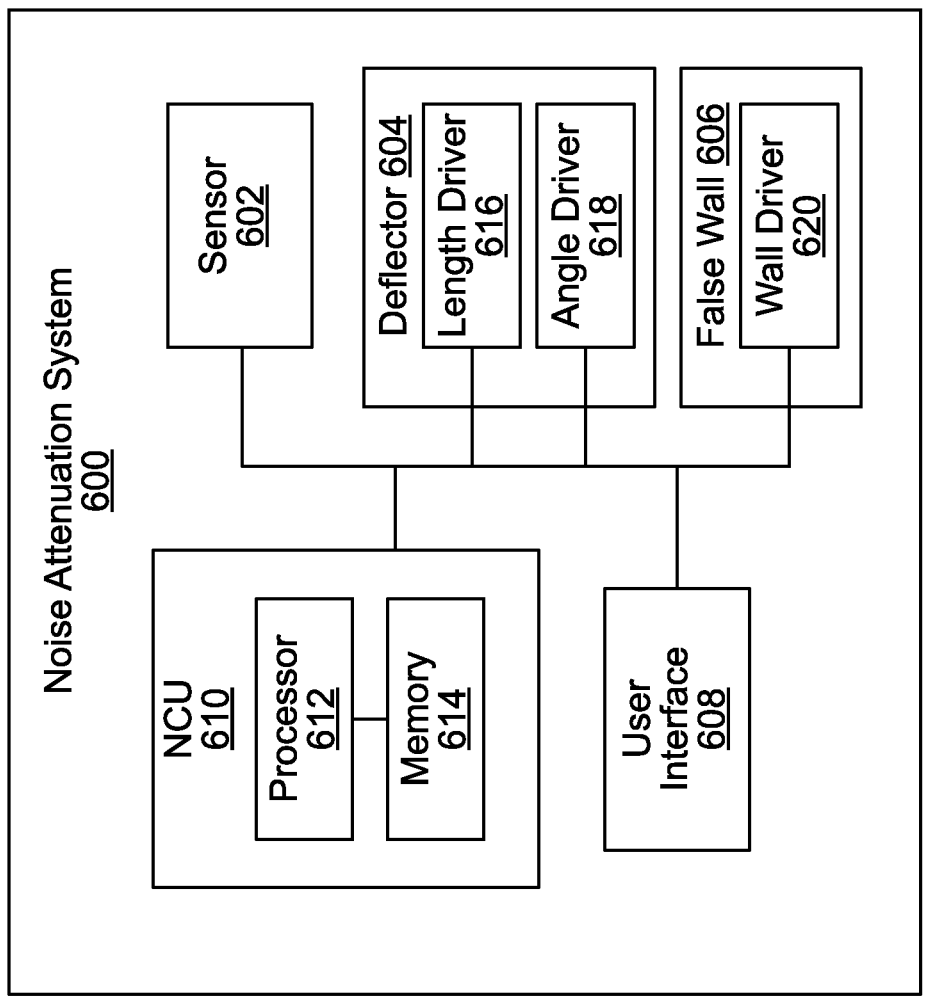
FIG. 11 is a block diagram of a noise attenuation system, according to an embodiment.

In other embodiments, the position of the deflector(s) and/or false wall(s) may be adjusted automatically based on feedback from one or more sensors (e.g., from at least one of the sensors). For example, the deflector assembly and/or false wall assembly may form part of a noise attenuation system structured to automatically adjust the position of the deflector(s) and/or false wall(s) in-situ to optimally balance noise attenuation and airflow restriction. FIG. 11 is a block diagram of a noise attenuation system 600 for a genset, according to an embodiment. The noise attenuation system 600 includes at least one sensor 602, a deflector assembly 604, a false wall assembly 606, a user interface 608, and a noise control unit (NCU) 610, which may be also referred to as a noise controller. In other embodiments, the noise attenuation system 600 may include additional, fewer, and/or different components.

Components of the noise attenuation system 600 may communicate with each other via any number of wired or wireless connections. For example, a wired connection may include a serial cable, a fiber optic cable, a CAT5 cable, or any other form of wired connection. In various example embodiments, components of the noise attenuation system 600 are connected to a genset control network such as a controller area network (CAN bus) or a manufacturer proprietary network. As shown in FIG. 11, each one of the components of the noise attenuation system 600 is communicatively coupled to facilitate the exchange of data (e.g., instructions, commands, signals, values, etc.).

The NCU 610 includes a processor 612 and memory 614. Memory 614 stores various instructions that, when executed by the processor 612, control at least partly the operation of various components and/or subsystems of the noise attenuation system 600. The processor 612 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits. Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory 614 (e.g., RAM, ROM, Flash Memory, hard disk storage, etc.) may store data and/or computer code for facilitating the various processes described herein. The memory 614 may be communicably connected to the processor 612 to provide computer code or instructions to the processor 612 for executing at least some of the processes described herein. Moreover, the memory 614 may be or include tangible, non-transient volatile memory or non-volatile memory. Accordingly, the memory 614 may include database components, object code components, script components, or any other type of information structure for supporting the various activities and information structures described herein.

Sensors 602 are positioned throughout the genset (e.g., enclosure 100 of FIGS. 1-2) to monitor and acquire data, information, etc. regarding the operational status and condition of a wide range of components and subsystems of the genset. Sensors 602 may each include a physical sensor including a sensing element that is structured to determine a condition of a fluid (e.g., air, etc.) entering, within, or leaving the genset enclosure (e.g., through the air inlet 112 and/or air outlet 114, etc.). Alternatively, or in combination, sensors 602 may include virtual sensors structured to determine one or more parameters regarding operation of a component (e.g., a condition of a fluid, such as air passing through the enclosure 100) using data from one of the other sensors 602 (e.g., analytically). Sensors 602 may include fan speed sensors (e.g., tachometer) structured to determine the operating speed (e.g., rotational speed) of a fan or other fluid driver, engine speed sensors structured to determine an engine operating speed, a pressure measurement sensor (e.g., pitot tube, pressure transducer, etc.) structured to determine a static pressure of air flowing through the enclosure and/or a differential pressure between two different locations within the enclosure (e.g., between the air inlet 112 and the air outlet 114, etc.), a sound sensor (e.g., microphone, etc.) structured to measure a sound/noise level, and or other types of sensors structured to determine an operating characteristic of the genset. Sensors 602 may additionally include sensors structured to determine a characteristic regarding the deflector(s) and/or false wall(s). For example, sensors 602 may include angular position sensors (e.g., hall effect, proximity sensors, etc.) structured to determine an angular position (e.g., angle 216 as shown in FIG. 4) of the deflector (e.g., the second portion 440 of the guide tracks 436 of FIG. 8, etc.), linear position sensors structured to determine a length (e.g., length 228 as shown in FIG. 4) of the deflector, and/or other types of sensors structured to determine the relative position between the deflector and the air inlet or air outlet.

The NCU 610 may be structured to receive and interpret sensor data from the sensors 602. The NCU 610 may be structured to determine a desired position of the deflector(s) and or false wall(s) in response to sensor data. For example, the NCU 610 may be structured to determine a position of the deflector to increase noise attenuation above a threshold value while, at the same time, minimizing the airflow restriction through the enclosure based on one, or a combination of, an operating characteristic of the genset and a characteristic regarding the deflector. The operating characteristic may include a flow rate of air through the enclosure, a pressure drop between the air inlet and air outlet, an engine and/or fan operating speed, a sound level, etc. The characteristic regarding the deflector may include an angular position of the deflector, a length of the deflector, and/or another characteristic indicative of a relative position between the deflector and one of the air inlet and air outlet.

In various embodiments, the NCU 610 may be structured to determine whether a sound level and/or an airflow restriction received from the sensor 602 or determined by a virtual sensor is included with the NCU 610 is outside of an allowable range by comparing the sensor data to one or more predefined thresholds stored in memory 614. For example, the NCU 610 may be structured to search, scroll through, or otherwise examine a table of predefined sound threshold levels and/or airflow restriction levels that correspond with the operating characteristics of the genset (e.g., the fan speed, the geometry of the enclosure, etc.). Additionally, the NCU 610 may be structured to control one or more actuators (e.g., the length driver 616, the angle driver 618, the wall driver 620, etc.) or the like based on the sensor data in order to maximize noise attenuation or achieve one or more operator preferences.

As shown in FIG. 11, the NCU 610 is coupled to a length driver 616, an angle driver 618, and a wall driver 620, and is structured to control the drivers to control a position of the deflector(s) and/or false wall(s). The length driver 616, the angle driver 618, and the wall driver 620 may be the same or similar to the length driver 432, the angle driver 430, and the wall driver 510, respectively described with reference to FIGS. 8-9.

The NCU 610 is structured to receive and interpret user data, information, and/or instructions from the user interface 608. The user interface 608 may include, but is not limited to, an interactive display (e.g., a touchscreen, etc.), a dashboard, a control panel, etc. The user interface 608 may display sensor data such as operating characteristic data and/or characteristics regarding the deflector reported by the sensors 602. The user interface 608 may be structured to receive a characteristic regarding the deflector and/or false wall from an operator or another user and to transmit the characteristic regarding the deflector and/or false wall to the NCU 610 for further processing. For example, the user interface 608 may enable a user to designate, select, or otherwise define the desired a desired angular position and/or length of the deflector, and the NCU 610 may control the length driver 616 and/or the angle driver 618 based on the desired position and/or length.

Figure 12:
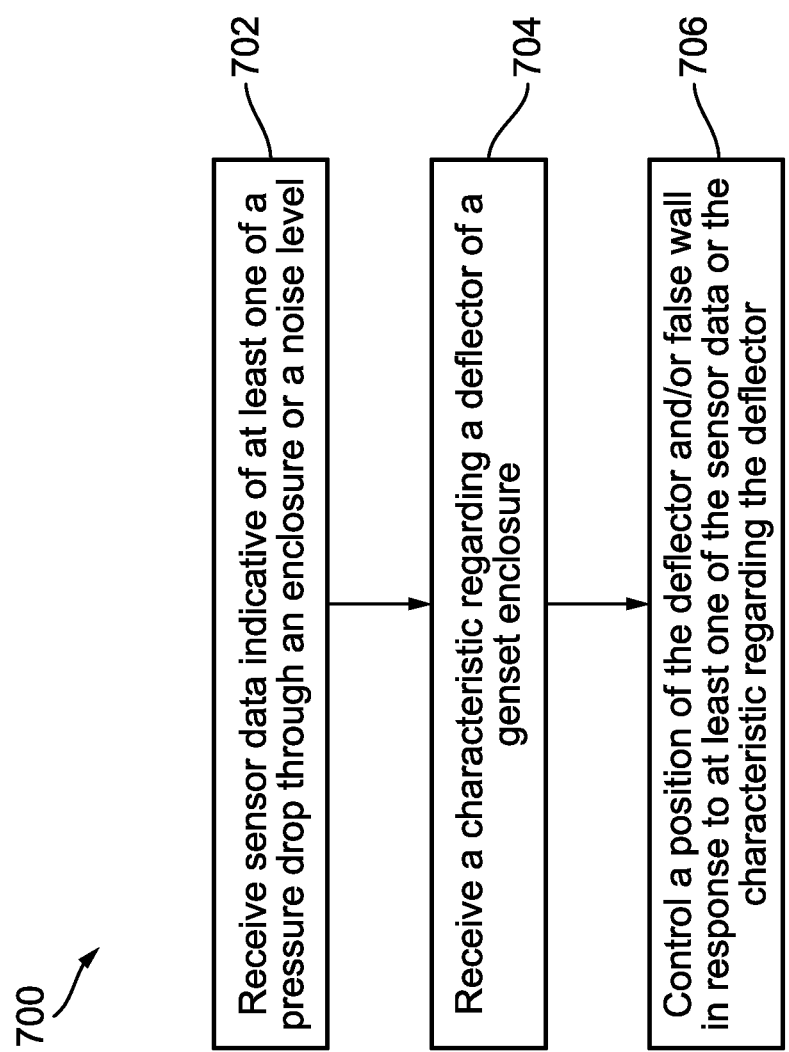
FIG. 12 is a flow diagram of a method of controlling a deflector and/or false wall, according to an embodiment.

FIG. 12 shows a flow diagram of a method 700 of controlling a position of a deflector and/or false wall, according to an embodiment. The method 700 of FIG. 12 may be implemented using the NCU 610 described with references to FIG. 11; for example, in order to control one, or a combination of, the angle driver 430, the length driver 432, and/or the wall driver 510 of FIGS. 8-9.

At 702, the NCU 610 receives sensor data indicative of at least one of a pressure drop through the enclosure (e.g., an airflow restriction) or a noise level. The noise level may be an exported noise measured by a microphone disposed a predefined distance from the air inlet or the air outlet and/or a noise level at another location relative to the genset. At 704, the NCU 610 receives a characteristic regarding the deflector and/or false wall of the genset enclosure. Operation 704 may include receiving sensor data from at least one of an angular position sensor structured to determine an angle of a second portion of a guide track of a deflector assembly, a linear position sensor structured to determine a length of the deflector (e.g., a distance that the deflector and/or false wall extends into the flow stream beneath the air inlet or air outlet, etc.), or another sensor structured to determine a position of the deflector within the enclosure.

At 706, the NCU 610 controls a position of the deflector and/or false wall in response to the sensor data. Operation 706 may include transmitting a control signal to at least one of an angle driver (e.g., angle driver 618), a length driver (e.g., length driver 616), or a wall driver (e.g., wall driver 620) to activate a motor or actuator that moves the deflector and/or false wall to minimize airflow restriction through the enclosure at a desired noise level. In the case of the deflector, operation 706 may additionally include varying the angular position of the deflector relative to the air intake or air outlet within a range between approximately 0° and 90° and varying the distance within a range between approximately 0 mm and 2975 mm or another suitable range based on the overall size of the enclosure and ventilation air openings. In other embodiments, the method 700 may include additional, fewer, and/or different operations.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the embodiments described herein.

While this specification contains many specific implementation details, these should not be construed as limitations on the scope of any embodiment or of what may be claimed, but rather as descriptions of features specific to particular implementations of particular embodiments. Certain features described in this specification in the context of separate implementations can also be implemented in combination in a single implementation.

Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A genset, comprising:
   an enclosure defining an at least partially enclosed space and a ventilation air opening, the ventilation air opening fluidly coupling the enclosed space with an environment surrounding the enclosure; and
   a deflector assembly, comprising:
     a deflector disposed within the enclosed space; and
     an angle driver structured to adjust an angular position of the deflector relative to the ventilation air opening.

2. The genset of claim 1, wherein the angle driver is structured to vary the angular position of the deflector relative to the ventilation air opening within a range between approximately 0° and 90°.

3. The genset of claim 1, wherein the deflector assembly further comprises a length driver structured to vary a distance that the deflector extends into a flow path of the ventilation air opening.

4. The genset of claim 3, wherein the length driver is structured to vary the distance within a range between approximately 0 mm and 3000 mm.

5. The genset of claim 1, wherein the deflector is formed in a plurality of sections that are coupled to one another such that an end of a first section of the plurality of sections is coupled to an end of a second section of the plurality of sections.

6. The genset of claim 1, further comprising a controller configured to control the angle driver automatically based on feedback from at least one of a fan speed sensor, a pressure measurement sensor, an engine rotational speed sensor, or a sound sensor.

7. A method, comprising:
   receiving sensor data indicative of at least one of a pressure drop through an enclosure or a noise level;
   receiving a characteristic regarding a deflector of a genset enclosure; and
   controlling a position of the deflector in response to at least one of the sensor data or the characteristic regarding the deflector.

8. The method of claim 7, wherein the characteristic regarding the deflector is one of an angular position of the deflector and a length of the deflector.

* * * * *